US008210077B2

(12) United States Patent
Carmichael et al.

(10) Patent No.: US 8,210,077 B2
(45) Date of Patent: Jul. 3, 2012

(54) DEVICE FOR CUTTING LABELS IN A LABELLING MACHINE

(75) Inventors: James Carmichael, Edinburgh (GB); Massimiliano Dalcielo, Rapallo (IT); Marco Ferri, Porto Mantovano (IT)

(73) Assignee: Sidel Holdings & Technology SA, Pully (CH)

( * ) Notice: Subject to any disclaimer, the term of this patent is extended or adjusted under 35 U.S.C. 154(b) by 193 days.

(21) Appl. No.: 12/297,761

(22) PCT Filed: Dec. 20, 2007

(86) PCT No.: PCT/EP2007/064304

§ 371 (c)(1), (2), (4) Date: Oct. 20, 2008

(87) PCT Pub. No.: WO2008/080871

PCT Pub. Date: Jul. 10, 2008

(65) Prior Publication Data

US 2009/0250172 A1 Oct. 8, 2009

(30) Foreign Application Priority Data

Dec. 29, 2006 (EP) .................................... 06425884

(51) Int. Cl.
*F16C 37/00* (2006.01)

(52) U.S. Cl. ............... 83/171; 492/12; 492/46; 384/476

(58) Field of Classification Search .............. 83/15, 170, 83/171, 16; 492/12, 46; 384/467, 476
See application file for complete search history.

(56) References Cited

U.S. PATENT DOCUMENTS

| | | | | |
|---|---|---|---|---|
| 2,789,021 | A * | 4/1957 | Pedersen | 384/461 |
| 4,541,738 | A * | 9/1985 | Leibensperger et al. | 384/470 |
| 5,494,355 | A * | 2/1996 | Haase | 384/144 |
| 6,230,597 | B1 | 5/2001 | Baba et al. | |
| 6,658,975 | B2 | 12/2003 | Schinelli | |
| 2001/0054343 | A1 | 12/2001 | Schinelli | |
| 2008/0011138 | A1 * | 1/2008 | Brazell et al. | 83/100 |
| 2010/0307011 | A1 * | 12/2010 | Hurley et al. | 30/320 |

FOREIGN PATENT DOCUMENTS

| | | |
|---|---|---|
| EP | 0943404 | 9/1999 |
| EP | 1177981 | 2/2002 |
| EP | 1279604 | 1/2003 |
| JP | 403258402 A * | 11/1991 |

* cited by examiner

*Primary Examiner* — Kenneth E. Peterson
(74) *Attorney, Agent, or Firm* — Pearne & Gordon LLP

(57) ABSTRACT

A device (1) for cutting labels in a labelling machine, including a cutting roller (2) having at least one blade (3) co-operating with a fixed counter-blade (4) able to be operatively associated to the roller for cutting the labels, a mechanical shaft (5) whereon is keyed said cutting roller (2), a frame (6) to support said mechanical shaft (5) and a heat exchanger circuit containing an operating fluid. Precisely, a first portion (9*a*) of said circuit is constructed on said support frame (6) and a second portion (9*b*) of said exchanger circuit is constructed on said mechanical shaft (5), said exchanger circuit thermally interacting with said frame (6) and with said cutting roller (2). The device further includes an impeller for generating a flow of said operating fluid within the heat exchanger circuit, said impeller for generating a flow of said operating fluid being connected to the mechanical shaft (5) and being operatively inserted in said heat exchanger circuit.

18 Claims, 6 Drawing Sheets

DEVICE FOR CUTTING LABELS IN A LABELLING MACHINE

TECHNICAL FIELD AND BACKGROUND ART

The present invention relates to a device for cutting labels in a labelling machine of the type described in the preamble of present claim 1.

As known, the cutting roller finds its most extensive use to cut into segments or labels a thin film of polypropylene, PVC or plastic film in general, whereon are printed the images and data constituting the label.

It could nonetheless also be used for films made of other materials, for instance paper. Labelling machines that employ label films generally comprise:

- an assembly for unwinding the reeled film;
- a cutting assembly constituted by a vertical blade mounted on a roller rotating about a vertical axis, which in the technical jargon is called cutting roller, and by a fixed vertical counter-blade;
- a drum for picking up and transferring the cut label towards a roller for spreading the glue which intervenes in predetermined areas of the label.

Both the cutting roller, bearing the blade, and the pick-up drum are provided with internal chambers in which a vacuum is created and which communicate, through a plurality of holes, with the outer surface of the cutting roller or of the drum. Such a vacuum attracts and holds the labels while they are cut and then transferred onto the drum; the vacuum also retains the labels while they are on the drum itself.

The cutting of the film, which in some cases has a thickness of a few hundredths of a millimetre, presents several problems due mainly to the flexion or deformation of the support of the cutting roller.

Said flexion or deformation occurs mainly because of the unequal and inconstant heat expansions in the whole cutting roller. In particular it is evident that, at the start of the work process, the supports of the cutting roller have low temperatures which progressively increase as the hours of work increase, so that an operator is forced to adjust the position of the counter-blade during the working period.

Said flexion or deformation is caused by the frequent impact of the blade mounted on the roller against the counter-blade, the impact being necessary for cutting the labels.

According to a first prior art, to overcome the aforesaid drawback, the same Applicant has provided a cutting roller which comprises ducts able forcedly to carry oil, heated at a temperature exceeding that of the external environment by about 20-30° C., into the roller support frame. This allows to heat said support frame to a temperature of about 50° C. before starting the labelling cycle, and to maintain said temperature during the work of the machine.

A cutting roller heated in accordance with said first prior art has the important drawback of increasing the operating costs of the labelling machine. To heat the oil, it is necessary to provide an adequate heating system connected to the ducts obtained in the roller support frame.

Disadvantageously, an external heating system considerably increases the size of the labelling machine and requires particular maintenance.

According to a second prior art, from document EP 1177981 of the same Applicant it is known a cutting roller comprising a cooling line for the two support systems of the shaft of the cutting roller. The cooling line is preferably independent for each of the two systems and it comprises a probe for measuring the temperature of the related support which sends its measured value to a block for its comparison with a pre-set preferential temperature value. The block, according to the compared value, activates a solenoid valve inserted on a compressed air supply circuit connected to cooling line of the cutting roller.

More precisely, the cutting roller comprises, in correspondence with the two supports of its rotation shaft, ducts wherein compressed air at ambient temperature is sent. In correspondence with said supports are preferably provided temperature detection probes which activate or inhibit the flow of air by acting on appropriate solenoid valves inserted on the compressed air supply line.

The main drawback of a cutting roller obtained in accordance with said second prior art is that the use of compressed air does not allow an efficient heat exchange. Essentially, compressed air at ambient temperature is not able to absorb sufficient heat from the roller and from the frame, making said cooling system poorly efficient at high rates of rotation of the roller.

In accordance with a third prior art, there are cutting rollers cooled by oil circulating inside ducts obtained in the roller support frame.

In particular, an oil-cooled cutting roller requires an external pump able to send pressurised oil inside the ducts. Specifically, the pump is usually pneumatic and it comprises a piston, whose alternating motions necessary for sending the oil is actuated by alternating phases of intake and expansion of a gaseous fluid, typically air.

The main drawback of such a cutting roller is that the volumetric flow rate of oil delivered by the external pump is independent of the rotation rate of the roller. In particular, the volumetric flow rate of oil delivered into the ducts remains constant at any rotation rate of the cutting roller and, once it is set, it can no longer be varied. Essentially, the pump operates at constant speed, regardless of the angular velocity of the roller.

Consequently, this technical solution is not able to assure a constant and efficient cooling of the cutting roller, because, as the rotation rate of the roller changes, it volumetric flow rate of the cooling oil cannot be changed.

An additional drawback of said third prior art is represented by the need to use a control system able to identify any malfunctions of the pump, which makes the labelling machine costlier and more complex.

DISCLOSURE OF THE INVENTION

The aim of the present invention is to eliminate the aforesaid drawbacks and to make available a device for cutting labels in a labelling machine that is provided with a system for regulating temperature by means of an operating fluid, in which the volumetric flow rate of the fluid is variable according to rate of rotation of the cutting roller.

Another object of the present invention is to propose a device for cutting labels in a labelling machine that is provided with a cooling system integrated with the roller.

Another object of the present invention is to provide a device for cutting labels in a labelling machine that does not require specific maintenance interventions.

Another object of the present invention is to make available a device for cutting labels in a labelling machine that is provided with a fluid cooling system that is able to reduce the operating costs of the labelling machine, with respect to the cooling systems constructed in accordance with the prior art described above.

Another object of the present invention is to propose a device for cutting labels in a labelling machine that is provided with an effective, reliable cooling system.

A further object of the present invention is also to provide a device for cutting labels in a labelling machine that is able to assure an efficient lubrication of the mechanical parts in mutual rotation.

Yet another object of the present invention is to propose a device for cutting labels in a labelling machine that is able to reduce wear between the movable blade and the fixed counter-blade.

Said aims are fully achieved by a device for cutting labels in a labelling machine, constituting the subject of the present invention, which is characterised by the contents of the claims set out below.

BEST MODE FOR CARRYING OUT THE INVENTION

This and other aims shall become more readily apparent from the following description of a preferred embodiment illustrated, purely by way of non limiting example, in the accompanying drawing tables, in which.

With reference to the Figures, a device for cutting labels in accordance with the present invention is globally designated by the numeral 1 and it is installed on a labelling machine with continuous introduction of a reeled film of labels. In particular, a device according to the present invention finds its greatest application for cutting into segments or labels a thin film of polypropylene or PVC whereon are printed the images and the data constituting the label.

Figure 1:
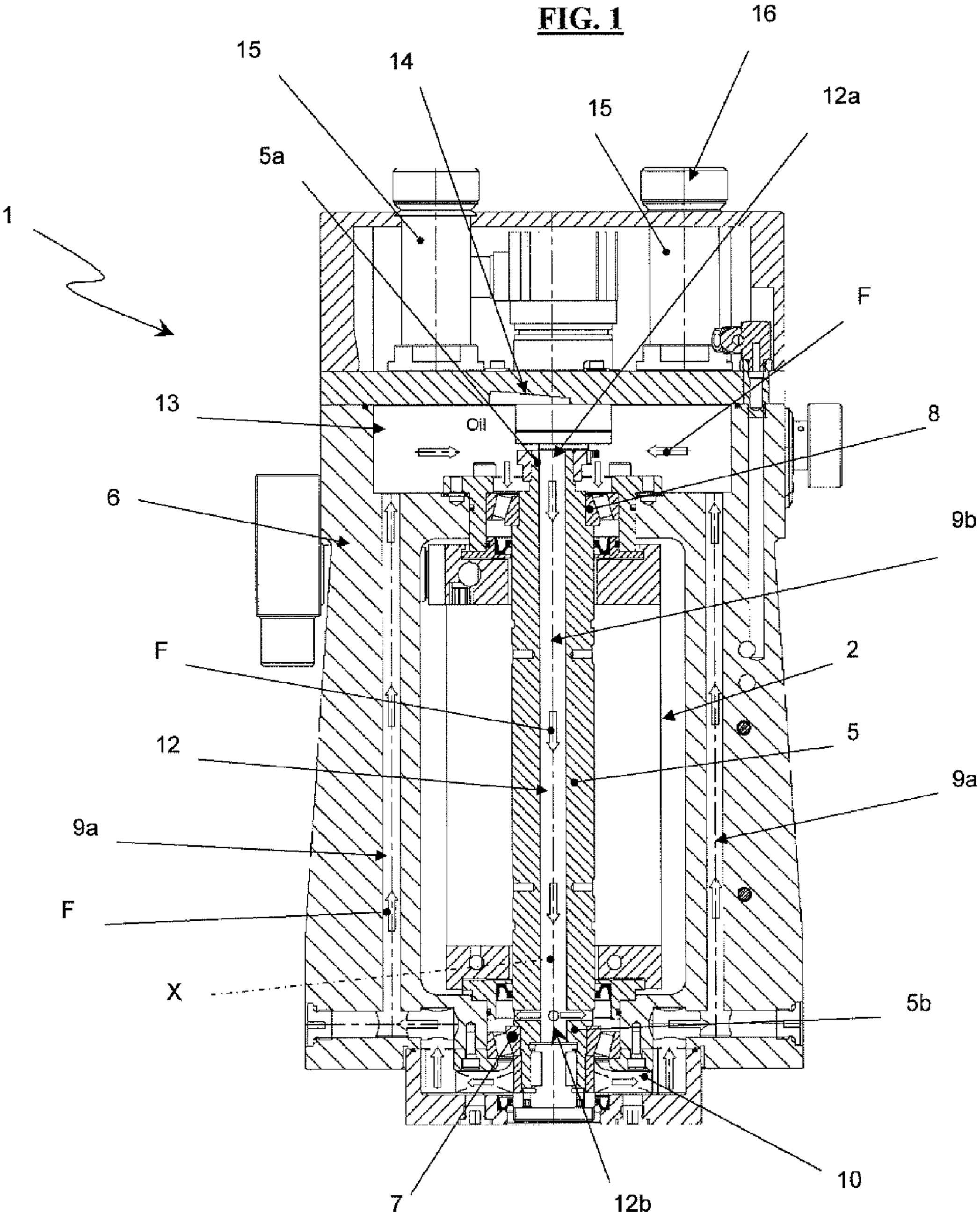
FIG. 1 shows a device for cutting labels in a labelling machine in a vertical section.
Figure 4:
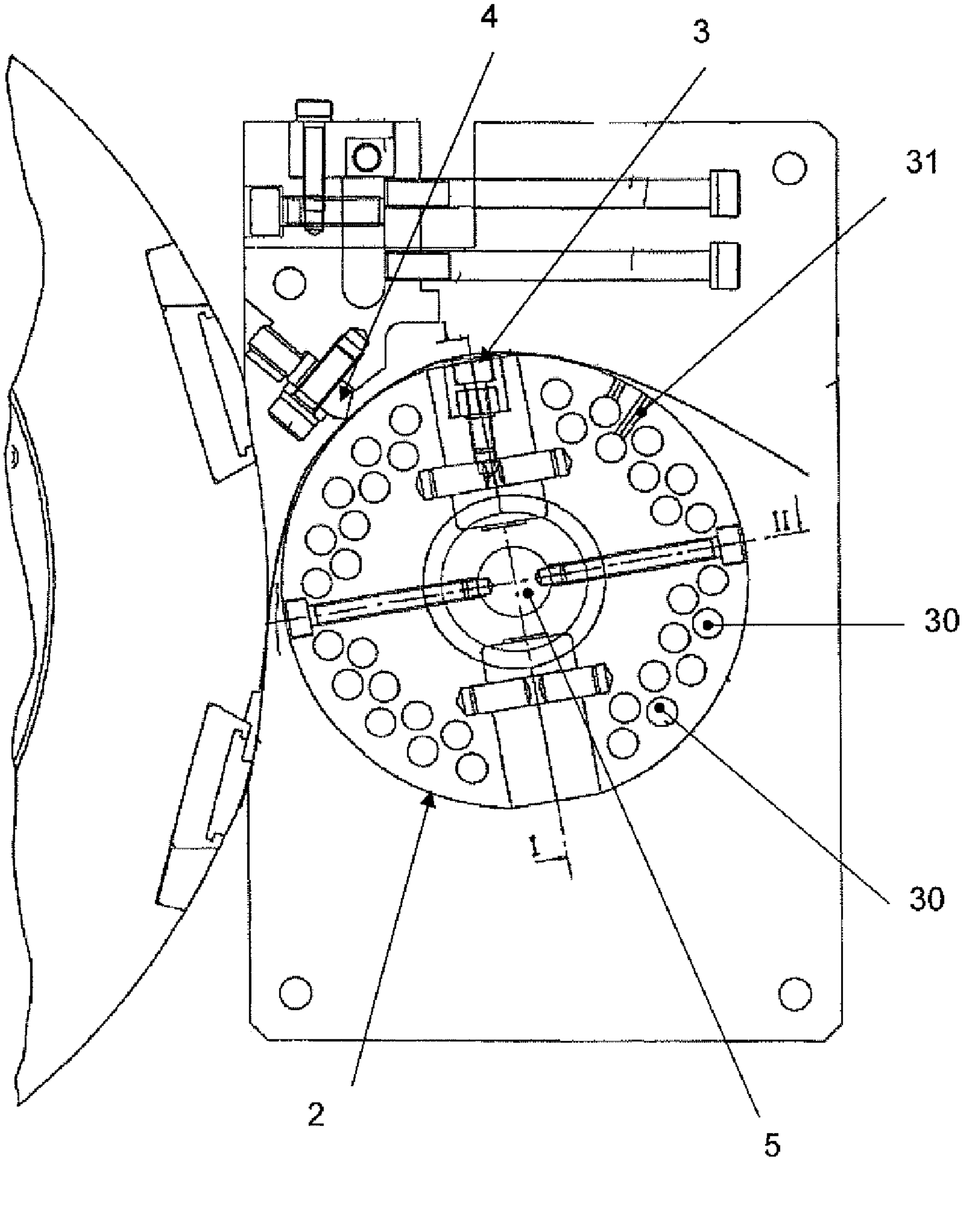
FIG. 4 shows a plan view of the device for cutting labels in a labelling machine illustrated in FIG. 1.

With particular reference to FIGS. 1 and 4, the device 1 for cutting labels comprises a cutting roller 2 provided with a blade 3 positioned along a generatrix of the cylinder and able to cut the labels in co-operation with a fixed counter-blade 4.

The cutting roller 2 is keyed on a mechanical shaft 5, which is fastened to a support frame 6 by means of a pair of bearings 7, 8, preferably of the type with taper roller bearings. On the support frame 6 is also fastened the fixed counter-blade 4.

In accordance with the invention, the device 1 is provided with a heat exchanger circuit containing an operating fluid, typically a liquid and preferably oil. In particular, a first portion 9*a* of said exchanger circuit is constructed on the support frame 6, whilst a second portion 9*b* of the exchanger circuit is constructed on the mechanical shaft 5. In this way, the exchanger circuit interacts thermally both with the support frame 6, and with the cutting roller 2.

In the preferred embodiment, illustrated herein, the exchanger is a cooling circuit, in which the operating fluid absorbs heat both from the cutting roller 2, and by the support frame 6. In an alternative embodiment, the heat exchanger may be a heating circuit, in which the operating fluid transfers heat both to the cutting roller 2, and to the support frame 6. Both the aforementioned embodiments achieve the purpose of controlling the temperature of the cutting roller 2 and of the support frame 6, in order to limit the thermal deformations thereof, thereby maintaining a correct interference between blade 3 and fixed counter-blade 4.

The device 1 comprises means for generating a flow of operating fluid inside the heat exchanger circuit. In particular, said means for generating a flow of operating fluid are connected to the mechanical shaft and are operatively inserted in said heat exchanger circuit.

In the preferred embodiment, said means for generating a flow of operating fluid comprise an impeller 10 connected to the mechanical shaft 5 of the cutting roller and operatively inserted in the heat exchanger circuit.

Figure 3:
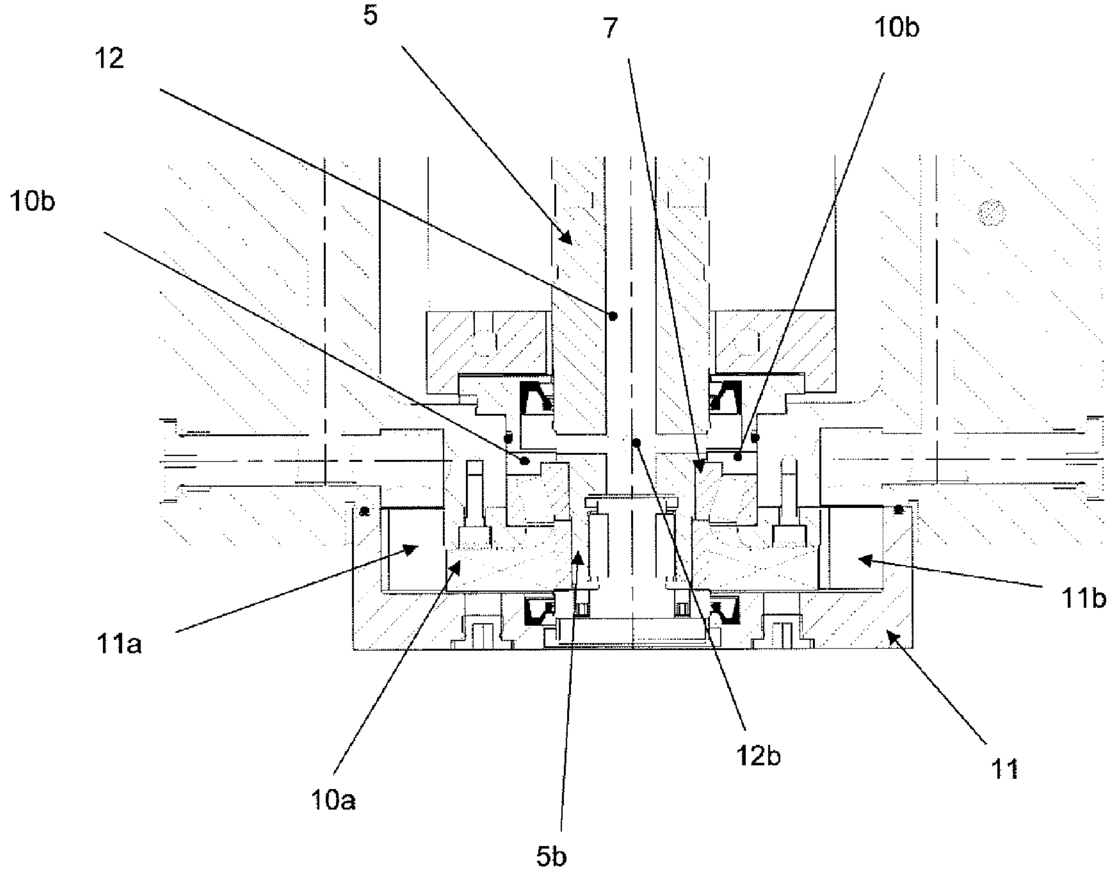
FIG. 3 shows a detail in a vertical section of the lower part of the device for cutting labels in a labelling machine illustrated in FIG. 1.

With particular reference to FIGS. 1 and 3, the impeller 10 is connected to the mechanical shaft 5. In the preferred embodiment illustrated herein, the impeller 10 is integrally keyed on the mechanical shaft 5, so the rotation rate of the cutting roller 2 coincides with the rotation rate of the impeller 10, both being integrally keyed on the same mechanical shaft 5.

Figure 6:
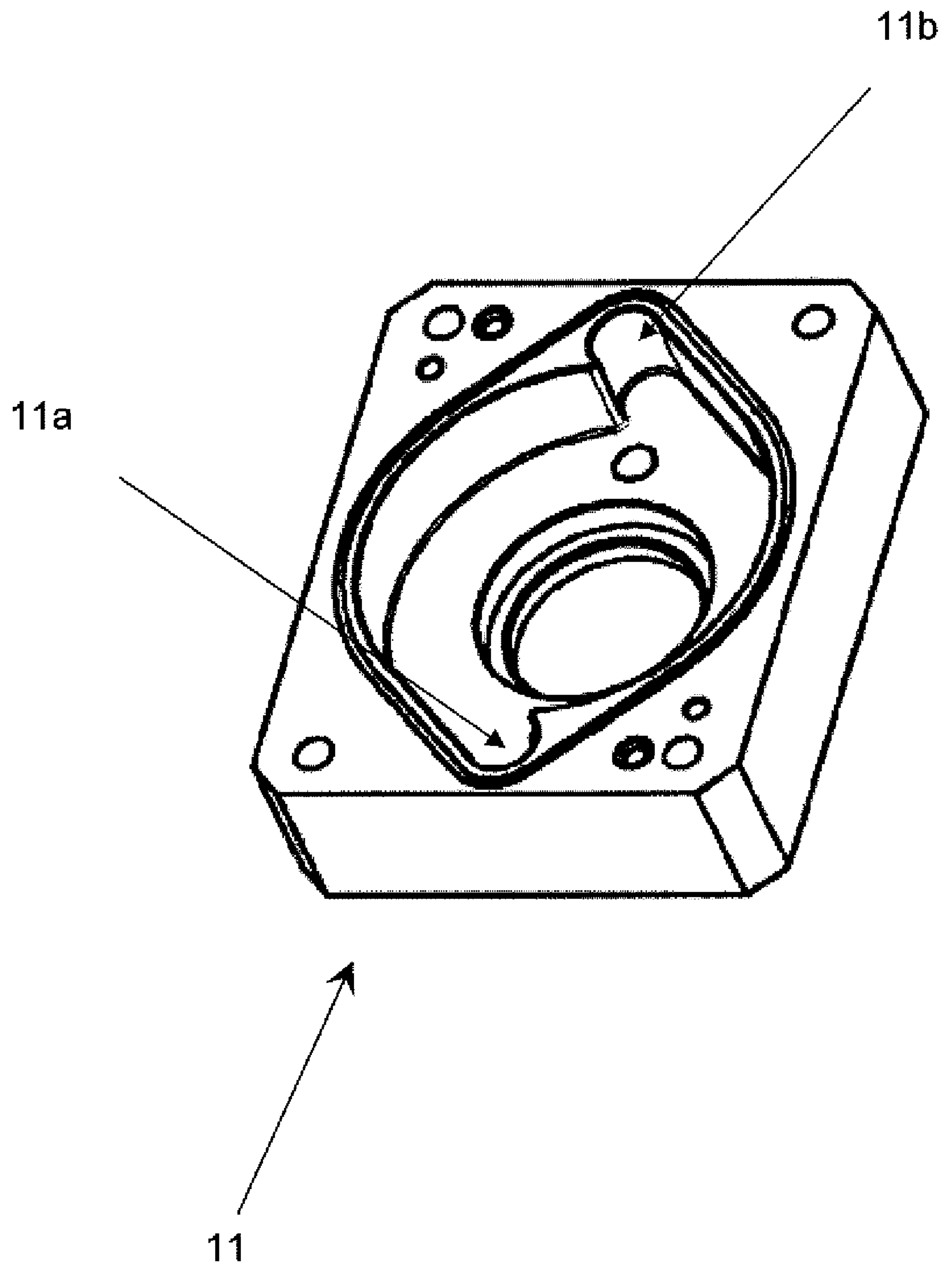
FIG. 6 shows a perspective view of a second structural element of the device for cutting labels in a labelling machine illustrated in FIG. 1.

The impeller 10 is preferably housed in a volute 11 (shown in FIG. 6) positioned below the cutting roller 2, at a base of the support frame 6. In particular, the volute 11 has a pair of delivery outlets 11*a*, 11*b* that are symmetrical relative to a vertical axis passing through the centre of the volute itself.

Figure 5:
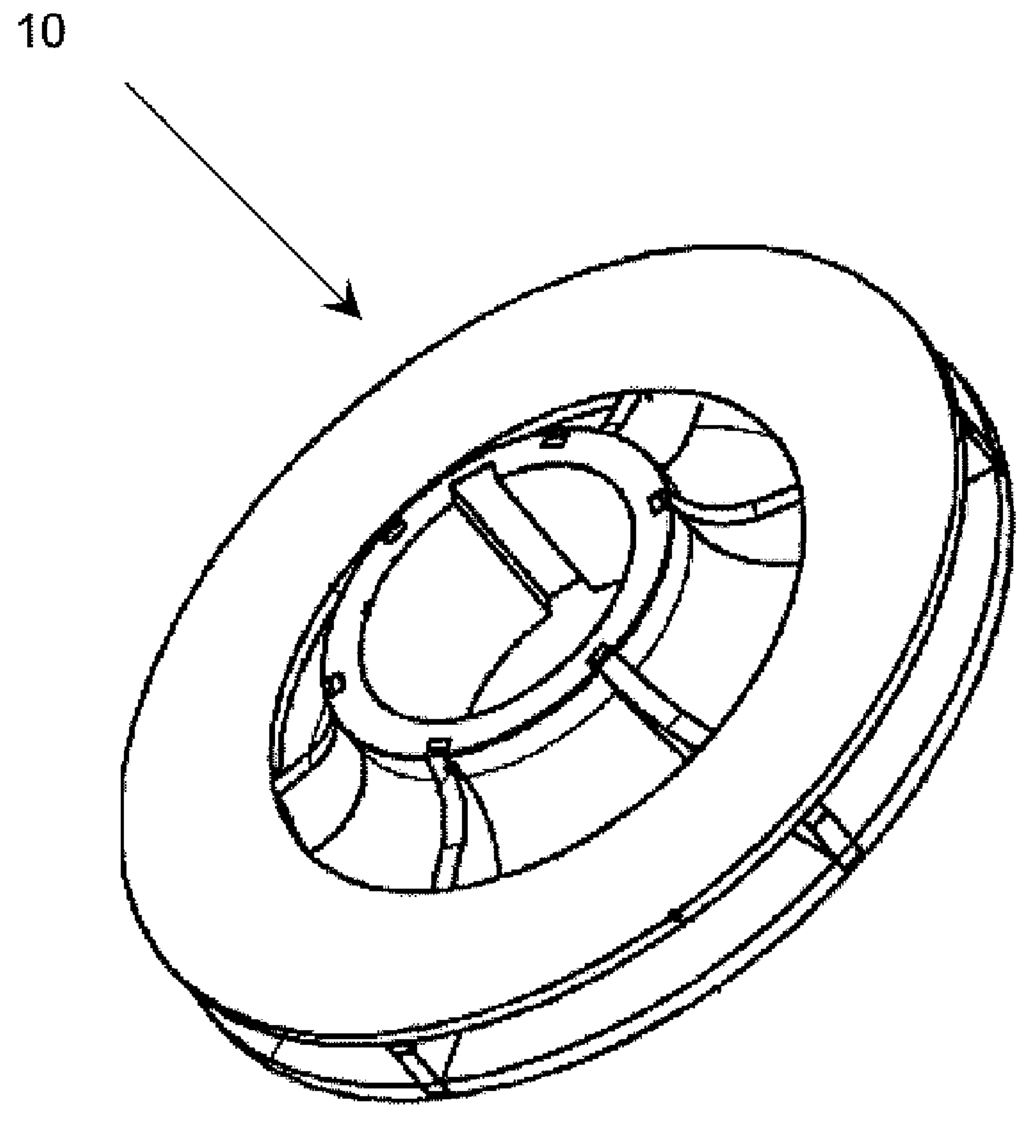
FIG. 5 shows a perspective view of a first structural element of the device for cutting labels in a labelling machine illustrated in FIG. 1.

With reference to FIG. 5, the impeller 10 is preferably of the closed radial type. The first portion 9*a* of the exchanger circuit is connected to a an outflow section 10*a* of the impeller 10, so said first portion defines a pair of delivery branches of the circuits, whilst the second portion 9*b* of the exchanger circuit is connected to an inflow section 10*b* of the impeller, so that said second portion defines a return branch of the circuit.

In the preferred embodiment, illustrated in the figures, the return branch of the exchanger circuit comprises a conduit 12 internal to the mechanical shaft 5 and coaxial thereto. In particular, the conduit 12 has an inlet 12*a* provided at a first end 5*a* of the mechanical shaft 5 and an outlet 12*b* positioned at a second end 5*b* of the mechanical shaft.

Figure 2:
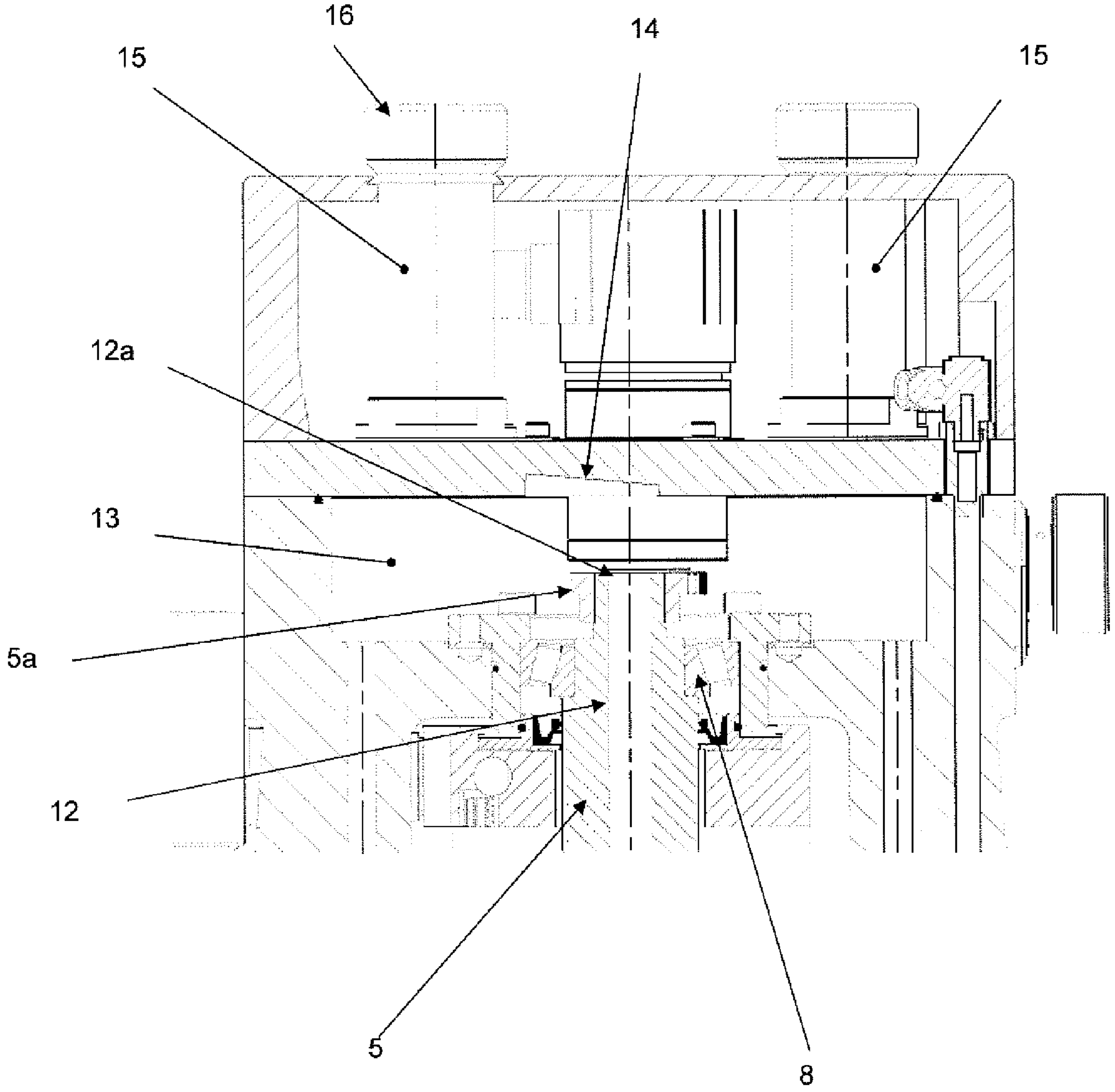
FIG. 2 shows a detail in a vertical section of the upper part of the device for cutting labels in a labelling machine illustrated in FIG. 1.

With particular reference to FIGS. 1 and 2, the device 1 comprises a manifold 13 to join said delivery branches with said return branch.

In the preferred embodiment, illustrated herein, the manifold 13 is provided with a vent channel 14 (FIGS. 1 and 2) able to expel any air bubbles present in the oil contained inside the exchanger circuit.

In particular, the vent channel 14 is defined by an inclined groove obtained on the support frame 6, preferably by milling. The inclination of said groove is such as to favour the sliding of any air bubbles towards a collecting tank connected to the exchanger circuit or directly into the environment by means of labyrinth seals.

In the preferred embodiment, the bearings 7, 8 supporting the mechanical shaft 5 are also inserted in the exchanger circuit, in order to be continuously lubricated by the oil that flows within the circuit. In particular, the impeller 10 receives the oil coming from the return branch and sends it to the delivery branches, making it pass through the conical rollers of the lower bearing 7. Similarly, the oil that flows within the return branch present in the mechanical shaft 5 traverses the taper rollers of the upper bearing 8.

With particular reference to FIGS. 1 and 2, the device 1 comprises a pair of expansion vessels 15 connected to the exchanger circuit and communicating therewith. In particular, each expansion vessel 15 is able to receive a quantity of oil, in such a way as to compensate for any changes in volume of the oil itself. Due to the absorption of heat from the cutting roller 2 and from the support frame 6, the oil undergoes a heat expansion with consequent volume increase. Advantageously, the presence of the expansion vessels enables to prevent dangerous pressure rises within the exchanger circuit and hence avoids mechanical breakage and oil leaks.

Preferably, each expansion vessel has an inlet to enable the introduction of oil into the exchanger circuit and it is provided with a plug 16 movable between an open position and a closed position of said inlet.

With particular reference to FIG. 4, the cutting roller 2 is provided with internal chambers 30 in which a vacuum is created, which communicate through a plurality of holes 31 with the outer surface of the cutting roller 2 to draw a suction on, and hold the labels during the step of cutting and transferring on a subsequent treatment roller, able to bring them to a glue roller (known and not shown herein).

The operation of the invention is as follows.

The mechanical shaft 5 sets in rotation the cutting roller 2 around a vertical axis "X" with a predetermined, variable angular velocity, so the impeller 10, being integrally keyed on the mechanical shaft 5, is set in rotation at the same angular velocity as the roller. In this way, the impeller 10 imposes a head within the exchanger circuit, generating a flow of oil (indicated with the arrows F in FIG. 1) in the delivery and return branches of the circuit. Essentially, the impeller behaves as a centrifugal pump.

In particular, the oil of the return branch flows out from the outlet 12*b* of the conduit 12 internal to the mechanical shaft 5 and enters the impeller 10, flowing through the inflow section 10*b* and subsequently the lower bearing 7, which is thus effectively lubricated. The oil flowing out of the manifold 13 enters the conduit 12 internal to the mechanical shaft 5 through the inlet 12*a* and simultaneously it is sent to the upper bearing 8 which is thus effectively lubricated.

If the rotation rate of the cutting roller 2 undergoes a variation, e.g. to increase or decrease the production rate of the labelling machine, the rotation rate of the impeller also undergoes an immediate variation of the same extent.

As a result of the change in the rotation rate of the impeller, there is a change in the head imposed in the circuit by the impeller itself, and hence the volumetric flow rate out of the impeller.

The invention achieves important advantages.

First of all, a device for cutting labels in accordance with the present invention enables to change the volumetric flow rate of oil according to the rotation rate of the cutting roller. Advantageously, therefore, such a device is able to assure an efficient heat exchange between the oil and the roller/frame assembly, because any changes in the rotation rate of the cutting roller determine corresponding and immediate changes in the rotation rate of the impeller.

It should be noted that the rotation rate of the cutting roller determines the quantity of heat developed in the roller and in the support frame, due to the higher or lower frequency with which the movable blade interferes with the fixed counter-blade to cut the labels.

In the second place, a device according to the invention has little bulk, since the impeller is directly integrated on the cutting roller.

Advantageously, the presence of an integrated impeller on the cutting roller allows to reduce the operating costs of the labelling machine relative to cooling systems constructed according to the prior art, because it allows for a more effective heat exchange at every rotation rate of the roller.

An additional advantage of the present invention is that such a device requires no specific and programmed maintenance interventions.

Advantageously, a device for cutting labels according to the invention, effectively and reliably limiting the thermal deformations of the cutting roller and of the support frame, enables to reduce the wear deriving from the rubbing contact between movable blade and fixed counter-blade.

Advantageously, the insertion of bearings supporting the mechanical shaft within the exchanger circuit allows an effective lubrication of the taper rollers present inside the bearings.

The invention claimed is:

1. Device (1) for cutting labels in a labelling machine, comprising:

- a cutting roller (2) having at least one blade (3) co-operating with a fixed counter-blade (4) able to be operatively associated to the roller for cutting the labels;
- a mechanical shaft (5) whereon is keyed said cutting roller (2);
- a frame (6) to support said mechanical shaft (5);
- a heat exchanger circuit containing an operating fluid, a first portion (9*a*) of said circuit being constructed on said support frame (6), said exchanger circuit thermally interacting with said frame (6);
- means for generating a flow of said operating fluid within the heat exchanger circuit, characterized in that said means for generating a flow of said operating fluid are connected to the mechanical shaft (5) and are operatively inserted in said heat exchanger circuit;
- said means for generating a flow of said operating fluid comprising an impeller (10) connected to the mechanical shaft (5), the heat exchanger circuit being a closed circuit through a plurality of passageways so that the operating fluid, during operation, is recirculated through said closed circuit, wherein the closed circuit passageways pass through a first bearing, then longitudinally through the mechanical shaft, then through a second bearing, then back through said frame to said first bearing again, to thereby regulate the temperature of the cutting roller, bearings and frame.

2. Device as claimed in claim 1, wherein said impeller (10) is housed in a volute (11) positioned inferiorly to the cuffing roller (2).

3. Device as claimed in claim 2, wherein said volute (11) has a pair of deliveries (11*a*, 11*b*) symmetrical relative to a vertical axis passing through the centre of the volute (11).

4. Device as claimed in claim 1, wherein said impeller (10) is keyed on said mechanical shaft (5).

5. The device as claimed in claim 1, wherein the volumetric flow rate of the operating fluid through the closed circuit varies according to the rate of rotation of the cutting roller (2).

6. Device as claimed in claim 1, wherein said first portion (9*a*) of the heat exchanger circuit defines at least one delivery branch and a second portion (9*b*) of the exchanger circuit defines at least one return branch.

7. Device as claimed in claim 6, wherein said second portion (9*b*) of the exchanger circuit comprises a conduit (12) internal to the mechanical shaft (5) and coaxial thereto, said conduit (12) having an inlet (12*a*) positioned at a first end (5*a*) of the mechanical shaft (5) and an outlet (12*b*) positioned at a second end (5*b*) of said mechanical shaft (5).

8. Device as claimed in claim 6, further comprising a manifold (13) for joining said delivery branch to said return branch.

9. Device as claimed in claim 8, wherein said manifold (13) comprises a vent channel (14) for expelling any air bubbles present inside the exchanger circuit.

10. Device as claimed in claim 9, wherein said vent channel (14) is defined by an inclined groove obtained on said support frame (6), the inclination of said groove being such as to favour the sliding of any air bubbles towards a collecting tank connected to the exchanger circuit.

11. Device as claimed in claim 1, wherein a second portion (9*b*) of said exchanger circuit is constructed on said mechanical shaft (5), said exchanger circuit thermally interacting with said cutting roller (2).

12. Device as claimed in claim 1, wherein said bearings (7, 8) comprise a plurality of taper rollers.

13. Device as claimed in claim 1, further comprising at least one expansion vessel (15) connected to the exchanger circuit and communicating therewith, said expansion vessel (15) being able to receive a quantity of operating fluid, in such a way as to compensate any changes in volume of the fluid itself.

14. Device as claimed in claim 13, wherein said expansion vessel (15) has an inlet to enable the introduction of operating fluid into the exchanger circuit, said expansion vessel (15) being provided with a plug (16) movable between an open position and a closed position of said inlet.

15. Device as claimed in claim 1, wherein said operating fluid is a liquid.

16. Device as claimed in claim 15, wherein said liquid is oil.

17. The device as claimed in claim 15, wherein said operating fluid, as it circulates through said closed circuit, lubricates a bearing supporting the mechanical shaft (5).

18. The device as claimed in claim 15, wherein said operating fluid, as it circulates through said closed circuit, lubricates a pair of bearings supporting the mechanical shaft (5).

* * * * *